(12) United States Patent
Felk

(10) Patent No.: US 6,199,662 B1
(45) Date of Patent: Mar. 13, 2001

(54) BEARING PROTECTOR DEVICE

(76) Inventor: Edward Karl Felk, 126 Skye Pt. Rd., Coal Point, NSW (AU), 2283

( * ) Notice: Subject to any disclaimer, the term of this patent is extended or adjusted under 35 U.S.C. 154(b) by 0 days.

(21) Appl. No.: 09/175,109

(22) Filed: Oct. 19, 1998

(51) Int. Cl.[7] .................................................. F16N 11/04
(52) U.S. Cl. ...................... 184/5.1; 184/45.1; 384/462; 301/108.1
(58) Field of Search ................... 184/5, 5.1, 45.1, 184/105.3; 384/373, 462, 473; 301/108.1

(56) References Cited

U.S. PATENT DOCUMENTS

| | | | |
|---|---|---|---|
| 1,544,205 | * 6/1925 | Barrett | 184/45.1 |
| 1,634,112 | * 6/1927 | Montgomery | 184/45.1 |
| 2,011,616 | * 8/1935 | Clarke | 184/45.1 |
| 2,498,090 | * 2/1950 | MacIndoe | 184/45.1 |
| 3,077,948 | * 2/1963 | Law | 184/45.1 |
| 3,955,852 | * 5/1976 | De Puydt et al. | 184/45.1 |
| 4,058,185 | * 11/1977 | Ploeger | 184/5.1 |
| 4,106,816 | * 8/1978 | August | 184/5.1 |
| 4,190,133 | * 2/1980 | Ploeger | 184/5.1 |
| 4,496,030 | * 1/1985 | Gloviak | 184/45.1 |
| 4,941,550 | * 7/1990 | Blake | 184/5.1 |
| 5,054,859 | * 10/1991 | Goettker | 184/45.1 |

* cited by examiner

Primary Examiner—David A. Bucci
Assistant Examiner—Chong H. Kim

(57) ABSTRACT

A bearing protector device comprising: a tube embodying a flange, a relief cavity and a ledge within its internal wall, a cupped piston and a spring, and wherein the assembly is retained inside the tube by the flange at one end and the ledge requires no other device to retain the assembly within the tube.

1 Claim, 1 Drawing Sheet

BEARING PROTECTOR DEVICE

FIELD OF THE INVENTION

This invention relates to bearing protector devices of the type which automatically keep a constant pressure inside a wheel hub of a trailer or the like, to stop water and dirt from entering the hub.

BACKGROUND OF THE INVENTION

It is known that bearing protectors require many parts and complicated machining to make them function satisfactorily. Therefore, they are costly to manufacture and not easy to produce.

OBJECT OF THIS INVENTION

It is the object of this invention to provide an improved bearing protector that requires a small number of parts, is simple to assemble and inexpensive to produce.

SUMMARY OF THE INVENTION

This object is attained with this invention of a bearing protector which comprises an outer tube, a cupped piston with a grease nipple and including a spring to apply pressure to grease which is pumped through the grease nipple into a chamber in front of the piston and eventually through a bearing in a wheel hub. Incorporated within the wall of the bearing protector is a relief cavity to prevent over pressurizing. According to this invention the bearing protector is very easy to manufacture and assemble, requiring only 4 parts to make it function.

SPECIFIC DESCRIPTION

Figure 1:
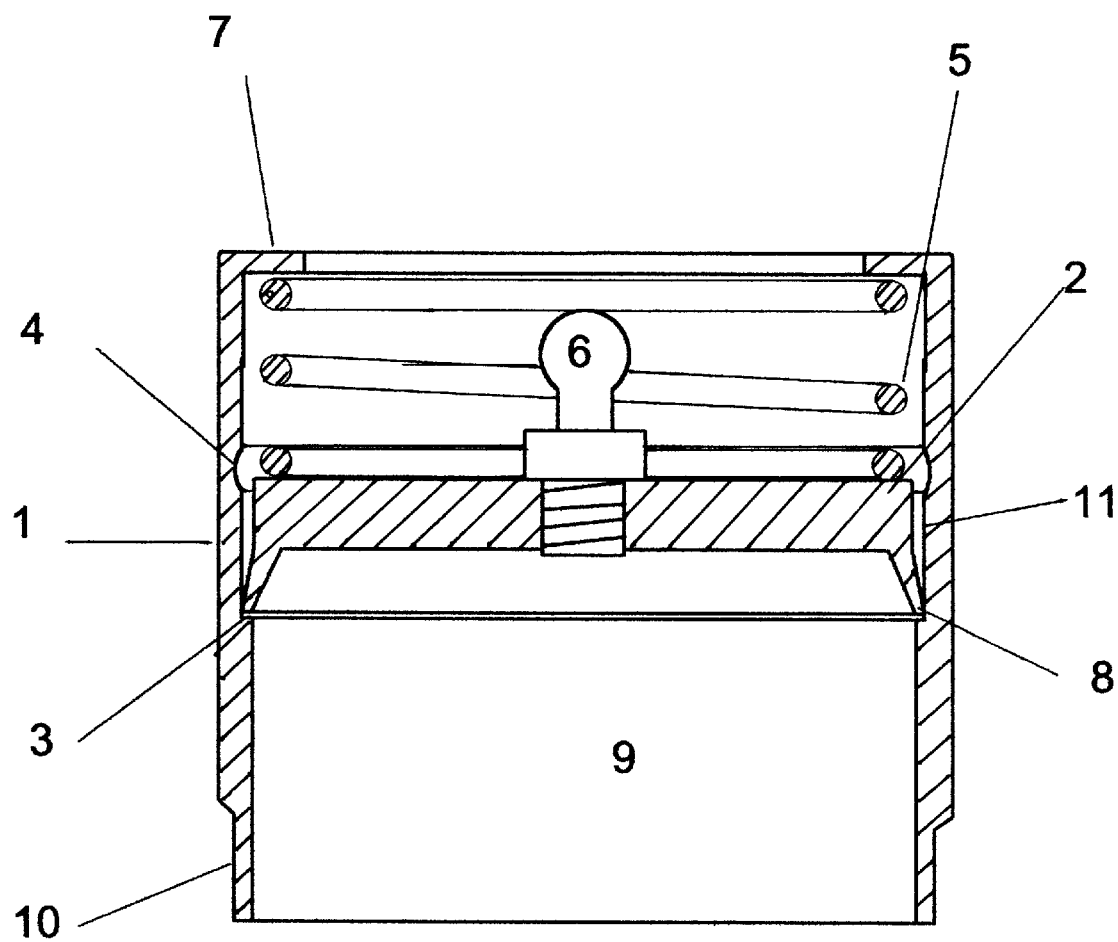
FIG. 1 shows the sectional view through the bearing protector.

FIG. 1 shows the mechanism of the bearing protector wherein an outer tube 1 embodies a flange 7 at the rear end for retaining spring 5, a ledge 3 inside the tube for a cupped piston 2, fitted with a grease nipple 6 to rest on, and a relief cavity 4 inside and behind the piston 2 at the rear of the tube. When the bearing protector is assembled all that is required is to place the spring 5 against the flange 7 followed by the piston 2 on top of the spring 5 and wherein the piston is then forcefully pushed into the tube. As the piston is being pushed through the tube towards a locking position, the lip 8 of the piston 2, which is made from flexible material, compresses to allow the piston 2 to pass freely in the tube 1 past the ledge 3 and when the lip 8 passes the ledge 3 the lip 8 springs back out to lock the assembly inside the tube 1 against the ledge 3. When grease is pumped into the chamber 9, the piston 2 is forced backward against the spring 5 compressing same against flange 7 and wherein when the piston's lip 8 passes into the relief cavity 4 and looses contact with the wall 11 inside tube 1, grease is released around the lip 8 to prevent over pressurising and possible damage of the bearing protector. With pressure being applied to the piston 2 by the spring 5 a constant pressure is maintained inside chamber 9 and the hub to which the bearing protector is fitted, same being held in the hub by an interference fit between the hub and the face 10 of the bearing protector. According to this invention the simplicity of this bearing protector is such that assembly takes only a few seconds and requires only 4 parts to manufacture the unit.

I claim:

1. The bearing protector comprising: a substantially round outer tube with an open end, said open end being the front of the tube, including a flanged end said flanged end being the rear of the said tube and a median portion said median portion being between a ledge at the front and a relief cavity in a form of a groove near the rear in front of the flange, said groove incorporated in and around an internal wall within said median portion and wherein the ledge, the relief cavity and the flange are formed in the tube and said tube is a one piece construction; a spring being means to urge forward a one piece cupped piston incorporating a lip having sealing means against the wall in said median portion, said lip being larger in diameter than an internal wall around the ledge and the wall within the median portion but smaller than the radial diameter of the groove in the relief cavity, a grease nipple fitted to said piston being means to pump grease forward of the piston and wherein said piston is made from flexible material, therefore enabling the spring and the piston to be fitted through the front of the tube with the spring placed against the flange inside the tube, with the piston against the spring and wherein the piston is forcibly pushed against the spring and past the ledge into the median portion where the piston and the spring are locked within said median portion with the lip of the piston against the ledge and the spring against the flange therefore requiring no other assistance to retain said piston and spring within said median portion wherein the piston is moveable between the ledge, a position where there is no pressure on the grease as the lip of said piston rests against the ledge and in sealing contact against the internal wall within said median portion, including a position anywhere between the ledge and the relief cavity where the grease is under positive pressure urged by the spring on the piston and a position where the piston lip being disposed within the groove and between the inner and outer surfaces of the tube and out of sealing contact with the internal wall within said median portion.

\* \* \* \* \*